United States Patent
Hartmaier et al.

(12) 
(10) Patent No.: US 6,301,474 B1
(45) Date of Patent: *Oct. 9, 2001

(54) MOBILITY EXTENDED TELEPHONE APPLICATION PROGRAMMING INTERFACE AND METHOD OF USE

(75) Inventors: Peter J. Hartmaier, Woodinville; William E. Gossman, Seattle, both of WA (US)

(73) Assignee: Openwave Technologies Inc., Redwood City, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 09/397,586

(22) Filed: Sep. 16, 1999

Related U.S. Application Data

(63) Continuation-in-part of application No. 08/720,089, filed on Sep. 27, 1996, now Pat. No. 5,978,672.

(51) Int. Cl.[7] .................................................. H04Q 7/38
(52) U.S. Cl. .................................... 455/417; 455/461
(58) Field of Search .................................. 455/417, 414, 455/422, 461; 379/211

(56) References Cited

U.S. PATENT DOCUMENTS

| | | | |
|---|---|---|---|
| 5,159,592 | 10/1992 | Perkins | 370/85.7 |
| 5,353,331 | * 10/1994 | Emery et al. | 455/461 |
| 5,377,186 | 12/1994 | Wegner et al. | 370/62 |
| 5,379,383 | 1/1995 | Yunoki . | |
| 5,418,844 | 5/1995 | Morrisey et al. | 379/207 |
| 5,425,090 | 6/1995 | Orriss | 379/201 |
| 5,428,665 | 6/1995 | Lantto | 379/58 |
| 5,440,613 | 8/1995 | Fuentes | 379/60 |
| 5,454,032 | 9/1995 | Pinard et al. | 379/167 |
| 5,469,496 | 11/1995 | Emery et al. | 379/58 |
| 5,474,748 | 12/1995 | Szabo | 422/186.04 |

(List continued on next page.)

FOREIGN PATENT DOCUMENTS

| | | | |
|---|---|---|---|
| WO 93 18606 | 9/1993 | (WO) | H04M/1/64 |
| WO 95 26114 | 9/1995 | (WO) | H04Q/7/24 |
| WO 96 13949 | 5/1996 | (WO) | H04Q/7/24 |
| WO 98 51097 | 11/1998 | (WO) | H04Q/3/00 |

OTHER PUBLICATIONS

PCT Search Report (PCT/US98/09306) dated Jan. 15, 1999.

PCT Search Report (PCT/US00/25073) dated Dec. 18, 2000.

Sevik, M. et al., "Customers In Driver's Seat: Private Intelligent Network Control Point," ISS'95, Apr. 1995, vol. 2, pp. 41–44.

Ramarao B C V, "Role of Application Gateways In A Global Intelligent Network," Intelligent Networks, May 4, 1992, pp. 358–367.

*Primary Examiner*—Andrew M. Dolinar
(74) *Attorney, Agent, or Firm*—Fulbright & Jaworski L.L.P.

(57) ABSTRACT

A mobility extended telecommunications application and method of use which comprises an integrated wireless and wirelined network with central control and which has a programmed interface to translate between the different protocols of the wireless and the wirelined networks to allow for automatic call redirection between said wireless network and said wirelined network. The application also provides for automatic activity detection on the wireline network. The application can be utilized between many networks and facilitates the utilization of the architecture of the wirelined network and the home location register of the wireless network for various applications on the wireless network.

50 Claims, 3 Drawing Sheets

U.S. PATENT DOCUMENTS

| | | | |
|---|---|---|---|
| 5,481,590 | 1/1996 | Grimes | 379/57 |
| 5,490,139 | 2/1996 | Baker et al. | 370/60 |
| 5,490,203 | 2/1996 | Jain et al. | 379/59 |
| 5,493,692 | 2/1996 | Theimer et al. | 455/26.1 |
| 5,497,412 | 3/1996 | Lannen et al. | 379/60 |
| 5,502,757 | 3/1996 | Bales et al. | 379/58 |
| 5,506,837 | 4/1996 | Sollner et al. | 370/31 |
| 5,506,887 | 4/1996 | Emery et al. | 379/58 |
| 5,509,062 | 4/1996 | Carlsen | 379/210 |
| 5,513,243 | 4/1996 | Kage | 379/58 |
| 5,519,706 | 5/1996 | Bantz et al. | 370/85.3 |
| 5,521,963 | 5/1996 | Shrader et al. | 379/60 |
| 5,526,403 | 6/1996 | Tam | 379/59 |
| 5,530,736 | 6/1996 | Comer et al. | 379/58 |
| 5,530,963 | 6/1996 | Moore et al. | 395/200.15 |
| 5,533,026 | 7/1996 | Ahmadi et al. | 370/94.1 |
| 5,533,114 | 7/1996 | Ballard et al. | 379/220 |
| 5,537,610 | 7/1996 | Mauger et al. | 379/58 |
| 5,542,094 | 7/1996 | Owada et al. | 455/54.1 |
| 5,544,226 | 8/1996 | Weis et al. | 379/61 |
| 5,544,227 | 8/1996 | Blust et al. | 379/63 |
| 5,579,535 | 11/1996 | Orlen et al. | 455/33.1 |
| 5,602,991 | 2/1997 | Berteau | 395/200.01 |
| 5,742,905 * | 4/1998 | Pepe et al. | 455/461 |
| 5,826,193 * | 10/1998 | Ghisler et al. | 379/211 |
| 5,901,359 | 5/1999 | Malmstrom | 455/461 |
| 5,905,719 | 5/1999 | Arnold et al. | 370/330 |
| 5,960,340 * | 9/1999 | Fuentes | 455/417 |
| 5,974,447 | 10/1999 | Cannon et al. | 709/206 |
| 5,978,672 | 11/1999 | Hartmaier et al. | 455/413 |
| 6,011,975 | 1/2000 | Emery et al. | 455/456 |
| 6,041,045 | 3/2000 | Alterman et al. | 370/313 |
| 6,049,711 | 4/2000 | Ben-Yehezkel et al. | 455/414 |
| 6,181,935 | 1/2001 | Gossman et al. | 455/433 |

* cited by examiner

MOBILITY EXTENDED TELEPHONE APPLICATION PROGRAMMING INTERFACE AND METHOD OF USE

RELATED APPLICATIONS

This application is a continuation-in-part of commonly assigned and co-pending U.S. application Ser. No. 08/720,089, entitled MOBILITY EXTENDED TELEPHONE APPLICATION PROGRAMMING INTERFACE AND METHOD OF USE, filed Sep. 27, 1996, issued as U.S. Pat. No. 5,978,672 which is hereby incorporated herein by reference herein.

TECHNICAL FIELD

This invention relates to the use of a local or private wireline telephone and data network as an element of an intelligent network and, more particularly, to a system and a method for automatic call redirection or data application interaction between wireless and wireline telephone and data application networks.

ACRONYMS The following acronyms, which are provided here for reference, are used in the specification.

AIN (Advanced Intelligent Network): The architecture of the wireline switched network that allows enhanced and customized services to be provided by the carriers HLR (Rome Location Register): The application that acts as the central repository of the profile of each mobile and maintains the current location and status of the mobile unit.

IP (Intelligent Peripheral): A generic term for any of a number of devices that provide services but are not involved in the routing of a call. They may use information available from SCP based applications, and they may send messages to these or update profile files in the mobile's data record. However, switching elements are not expected to launch inquiries to IP's in order to determine the correct routing of the calls.

LAN (Local Area Network): A communication system that interconnects a number of computer processing units when those units are some distance away from one another, but within the same contiguous property to allow private communications facilities to be installed. For the purposes of this document, LAN shall also include the facility to allow multiple computer processors to communicate with each other when some or all of those processors are within the same enclosure and connected by a common backplane.

MIN (Mobile Identity Number): The telephone number of the mobile device. It is the primary identifier of the data profile contained in the HLR.

MSC (Mobile Switching Center): Defined in the Bellcore definition of intelligent networks as the network element that is responsible for the actual circuit switched connection of the voice channels. In the general sense, the MSC makes very few routing decisions, obtaining all those from the SCP applications. In practice, there are many basic routing decisions that are made by the MSC and the practice reduces the network load and processing load to the SCP.

PBX (Private Branch Exchange): A telephone switching system located on the end user's premises that allows local intercommunication with all local telephone sets and with the public network.

PCS (Personal Communications Service): This term is used widely in the industry to mean a number of things. For the purposes of this document, it will refer to the latest set of cellular frequencies made available in North America in the 1.9 GHZ range. Therefore a PCS network is one where the 1.9 GHZ set of frequencies are being used. The document does not differentiate between PCS and cellular as a service and any difference between the two is not material to this invention.

SCP (Service Control Point): Defined in the Bellcore definition of intelligent networks, this network element is defined to be the device where services are controlled. In practice, the SCP will run applications that provide the services. The BLR is a service application that executes on the SCP. SCP applications are involved in the routing of a call.

STP (Signaling Transfer Point): A Bellcore defined network element that is responsible for the correct routing of network signaling messages.

TELCO (Telephone Company): The common carrier providing the wired service including the connection to the public switched telephone network (PSTN).

VLR (Visitor Location Register): An application that executes on the MSC which contains a temporary copy of the mobile telephones profile obtained from the HLR. It is stored locally to improve performance.

WIN (Wireless Intelligent Network): The architecture of the switched wireless network that allows enhanced and customized services to be provided by the carriers. The network automatically tracks the location of the mobile telephone. It includes all networks commonly referred to as cellular or PCS.

BACKGROUND

The Wireless Intelligent Network (WIN) architecture defines a model for the current cellular wireless and PC S networks. The concept of intelligent telephony networks was first implemented in wireline networks. Under the model of Advanced Intelligent Network (AN), wireline networks provide centralized control of telephone services to subscribers through diversely located central office switching systems. In an AIN system, central offices send and receive data messages from a SCP via a STP.

AIN-like networks provide personalized services to individual subscribers. It is important to note that any services provided to individuals while they are roaming or away from a home location require the subscriber to manually notify the network of his present location. The AIN model does not provide for mobility management that is based in the network.

Prior art AIN systems are exclusively land line communications systems, which provide telephone communication services via wired telephone lines. The signaling protocol used for AIN allows only for control of telephone network switching elements in response to processes or software functions that are based on the calling number, called number and other relatively fixed items, such as time of day, congestion control and end user control. Wireline communications, even those provided by the AIN, are necessarily limited by the fixed nature of installed lines. These systems make no provision for communications with any mobile link, except as taught by Emery et al. in U.S. Pat. Nos. 5,469,496 and 5,506,887.

While AIN provides the intelligent processing related to the wireline networks, WIN is the intelligent processing for wireless networks. In many ways they are similar and have used similar technologies, however, the model for WIN provides for the additional element of mobility. In the AIN architecture, both the originating and terminating telephones are assumed to be fixed, while in the WIN architecture the location of mobile subscribers must be tracked by the networks. The HLR is the data register that tracks the location of the mobile. The HLR contains profiles for each subscriber.

The wireless telecommunications industry has developed roaming standards which allow automatic handoffs from one cell to another during an established call, and to allow customers to roam from one system or network to another while having incoming calls follow the customer to the visited system. The protocol that accomplishes this functionality is set out in the EIA/TIA standard IS-41. The IS-41 protocol is an out-of-band signaling protocol, which may be transported by either X.25 or SS7 links.

The air interface link between the mobile cellular user and the appropriate base station uses particular radio frequencies that have been mandated by appropriate regulatory bodies. Dedicated trunk lines serve as the link between the base station and the MSC, and the interface between MSCs within the same system (same cellular carrier) is generally provided by dedicated land lines. Data links connect the mobile switching center to a VLR and HLR which can be located at the mobile switching center or at a remote point. The HLR may serve more than one MSC, but the VLR is typically dedicated to a particular MSC. The HLR is the location register that contains information about the user, such as directory number, profile information, feature list, current location, serial number, services authorized and validation period. The VLR is the location register on which an MSC temporarily stores information regarding a visiting subscriber or user. The difference between the VLR and the HLR is simply that the HLR is the permanent storage place for the subscriber record while the VLR is a temporary storage place used during a configurable time. The use of the VLR reduces the amount of network signaling needed to process the call handling. The subscriber record on the VLR is erased when the mobile is no longer active or has moved to another MSC.

Many mobility controllers of the above described cellular systems are now programmed to provide subscribers with selected special services. If the mobile subscriber had roamed to another system and registered on that system, the special features did not necessarily follow the subscriber. To enable seamless roaming for subscribers who use special services, the Wireless Intelligent Network (WIN) was developed. The WIN was developed as an extension to the CTIA's reference model. The first capability centers around consolidation of the network's location functions. Secondly, the network must have a robust SCP platform that runs multiple applications, and thirdly, the network must be enhanced by new "primitive" capabilities. A key enhancement to the WIN was realized by adding Service Control Function (SCF) functionality to the reference model. The SCF function replaced the HLR in the model and the HLR was redefined as an application using the SCF.

The WIN comprises three unique components. A MSC switch that provides call processing, including inherent service switching point (SSP) capabilities and features such as call waiting, call forwarding, and three-way calling. Second, the system uses the EIA/TIA IS-41 SS7 TCAP message protocol to provide intersystem handoff, automatic call delivery, automatic roaming and most importantly, remote feature access. Third, the WIN SCP provides mobility management, and a platform for hosting service logic for network applications.

Traditionally, the architecture of wireless networks places the burden of hosting new service applications on the mobile switch (MSC). MSCs are an expensive network element and are typically limited in the computing and database capacity needed to host new services. Therefore, MSCs are not well suited to support growth. By adopting the WIN architecture, wireless carriers place more network intelligence and mobility management functionality into SCPs. The WIN architecture is currently under deployment by various cellular carriers and is suited for use in all cellular and PCS networks.

Currently, consumers generally have access to wireless networks that offer voice service. In a few cases, carriers who use the WIN architecture and certain PCS carriers offer minimal advanced services such as short messaging or voice mail. The primary reason that consumers have such a limited suite of services from which to choose is due to the time and expense of developing services for use on a network wide basis. These services take many months to develop and must be justified by a business case that assumes use by the general population. The subject invention enables new applications to be developed and hosted in a focused, inexpensive and timely fashion to respond to customer demands.

Three issues must be addressed to meet the challenge of profitable, highly functional wireless networks. First, wireless applications must have a platform for operation that allows custom application tailoring to an individual customer's need, rather than the overall needs of all network users. Second, if this type of customization is to happen, the cost basis and development paradigm for these wireless applications must change dramatically. Third, billing and provisioning systems must be adapted to allow carriers to manage a new level of service flexibility and customization.

In prior art systems if a subscriber is unable to receive calls on a wireless device, or if the subscriber is not active on the wireless device, but wishes to have the calls sent to a specific device only if the subscriber is available at that new device, the subscriber must manually set the call-forward-immediate feature of the wireless device to have calls forwarded to another device, such as an office telephone. Therefore, if the subscriber desires to receive all incoming calls on the telephone in his or her office, then he or she must manually set the call-forward feature of the wireless device in order to receive calls that are directed to the wireless device. If the subscriber forgets to get the call forward feature, then calls to the wireless device will not be forwarded. Moreover, in prior art systems once the call forward feature is set, all calls to the wireless device continue to be forwarded to the wireline telephone even if the subscriber has left the office. Thus, once the user becomes inactive on the wireline phone and wants to receive calls on the wireless system again, he has to manually disable the wireless device's call forward feature.

Moreover, prior art systems do not provide call screening for calls forwarded from the wireless phone to the office wireline extension. Thus, all calls made to the wireless phone are forwarded to the wireline phone when the call-forward feature of the wireless phone has been manually set. This may not be a desirable arrangement if the subscriber does not want to be interrupted in the office by calls from a preselected group or at certain times of the day.

Prior art systems also do not provide for the interconnection of data applications executing in private networks with WIN signaling and control networks to make data applications WIN aware.

It is an object of this invention to provide an improved combined network system consisting of both a wireline network and a wireless network wherein the wireline network appears as a node on said wireless network and allows open architecture applications on said private network to run on said wireless network.

It is a further object of this invention to provide a system whereby wireline telephones may be treated by a mobile network management system as if they were mobile telephones assigned to the wireless network.

It is yet another object of this invention to provide a method of connecting wireline or private network-based applications to network based applications in both AIN and WIN models.

A further object of the invention is to reduce the cost of running specialized applications on wireless networks by utilizing portions of a private wireline network in lieu of multiple service control points.

A further object of the present invention is to provide an automatic call redirection system between a wireless and a wireline network.

A further object of the present invention is to detect when a user is active on a wireline telephone and to automatically forward calls from a wireless phone to a wireline telephone when the user is active on the wireline phone.

Another object of the present invention is to detect when a user becomes inactive on a wireline telephone and to automatically forward calls from the wireline telephone to a wireless telephone.

A further object of the present invention is to provide call screening for calls forwarded between wireline and wireless networks.

SUMMARY OF THE INVENTION

These and other objects, features and technical advantages are achieved by a system and method that provides the programming interface between applications executing on a private data network and applications executing in the WIN. The present invention also allows for automatic call redirection between a wireless and wireline communications system, including a method and system for automatically determining when a particular wireline extension is active.

The subject invention allows wireline telephones to be acquired by a mobile network management system as if the wireline telephones were mobile devices. It also provides a method of connecting private network based applications, such as Private Branch Exchange (PBX) applications, to network based applications in both the AIN and WIN models. The subject invention makes a private wired, wireless or combination network logically appear as an extension of the wireless (WIN) network or wireline (AIN) network with sub-SCP process (SP) that provides links to resident applications, such as voice mail, PBX, and information delivery services.

The SP consists of a process between the network SCP and the private network-based application, which converts a TSAPI or other standard link protocol into the IS-41 protocol or into some other WIN protocol that is supported by the network-based HLR. The subject invention allows other applications developed on the private network to extract or even modify the subscriber data that is stored in the SCP-based application and to be enhanced with the added functionality of having knowledge of the subscriber profile stored in the SCP-based application. The present invention allows the interconnection of the AIN or WIN profile and WIN mobility information with applications developed and executing locally on a private network.

Furthermore, the present invention provides automatic call redirection in which calls to a wireless phone are automatically forwarded to a wireline telephone on a PBX system if the user is active on the wireline telephone. This is accomplished by notifying the SCP that the wireline telephone is active so that the SCP can set the incoming call destination to the wireline telephone. In an alternate embodiment, the call-forward-immediate feature of the wireless telephone is automatically set to the number for the wireline telephone. Thereafter, all calls to the wireless telephone are automatically forwarded to the wireline telephone by the HLR. The user is assumed to be active on the wireline telephone if any activity is detected on the wireline telephone. Such activity is detected when the user makes outgoing calls from the wireline telephone, receives an incoming call on the wireline telephone, or simply lifts and replaces the handset on the wireline telephone. Additionally, other activities may imply that the user is active on the wireline telephone.

Similarly, if the user is inactive on the wireline telephone the state of the wireline telephone is changed from active to inactive. In this case, the SP notifies the SCP that the J.O wireline telephone is inactive and calls to the wireless telephone are no longer routed to the wireline telephone. For example, the SP may deactivate the wireless call-forward-immediate feature so that calls to the wireless telephone will no longer be routed to the wireline telephone.

Calls to the wireline telephone are routed to the wireless telephone only when the wireless telephone is in a position to receive a call. If the wireless telephone is active and registered with a cellular network, then it is in a position to receive a call. If both the wireless and the wireline telephones are not ready to receive any call then the call is forwarded to a pre-selected destination, for example, to the user's voice mail.

Reference is made to a TSAPI link, which is the Novel's implementation of the Computer Telephony Interface as defined by the European Computer Manufacturer's Association Computer Supported Telecommunications Applications (ECMA CSTA). Other implementations include TAPI (from Microsoft) and proprietary links such as MiTAI from Mitel, Meridian Link from Nortel, and Call Path from IBM. TAPI, MAPI and TSAPI are Application Programming Interfaces (APIs).

Signaling from the private network interface to the network-based HLR will be over X.25, TCP/IP (internet) or appropriate private virtual circuits (closed user groups) and will use the IS-41 protocol or proprietary remote service calls and procedures that may be available from specific vendors or the SCP/liLR. This connection will have the effect of acquiring the private network as an intelligent node on the cellular network complete with its own unique addressing. Its support of the IS-41 protocol or vendor specific processes will ensure that minimal changes in the HLR software will be required and that the subject invention achieves the goal of lower implementation costs.

Furthermore the SP can be extended with an SS7 link in order to allow the SP to serve as a general SCP/BLR in the cellular carrier's network. This will allow carriers to lower operating costs by having a software-based HLR process that can run on lower cost server-class PC's or similar processors. In this instance, it is likely that the SCP process would be located on one of the cellular carrier's own private networks to ensure security and accessibility.

The subject invention achieves reduction in the cost of specialized and custom applications. Currently new applications on the SCP can cost $100,000 to $1 million while new applications developed using the subject invention will cost $1,000 to $100,000 per license greatly reducing the cost of adding new services. As a common interface it will facilitate new inventions and applications that expand the functionality and use of the wireless and wired networks.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims.

BRIEF DESCRIPTION OF THE DRAWING

For a more complete understanding of the present invention, and the advantages thereof, reference is now made to the following descriptions taken in conjunction with the accompanying drawings, in which.

DETAILED DESCRIPTION

Figure 1:
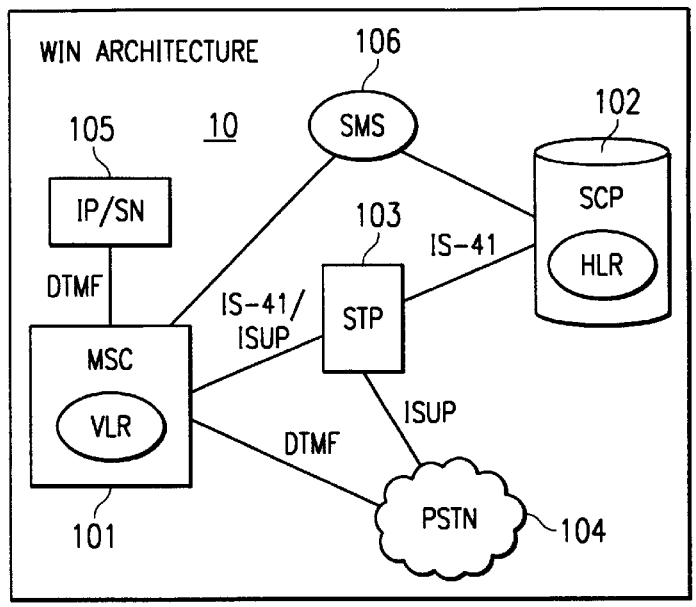
FIG. 1 is a block diagram of the Wireless Intelligent Network (WIN) architecture.

FIG. 1 illustrates the Wireless Intelligent Network (WIN) architecture 10. Mobile Switching Center (MSC) 101, or some other telephone switching system, switches voice channels between cell site trunks and land line connections. MSC 101 is connected to STP 103. STP 103 is shown as a separate unit, however, it may be implemented directly on the same hardware platform as MSC 101. STP 103 transfers messages to other STPs for routing to MSCs, SCPs or other network elements.

SCP 102 manages applications, such as the Home Location Register (HLR). HLR 102 stores user profiles, which include such items as Electronic Serial Number (ESN), Mobile Identification Number (MIN), current mobile unit location, validation periods and authorized services.

STP 103 is connected to Public Switched Telephone Network (PSTN) 104 via signaling links. MSC 101 is connected to PSTN 104 by voice channels and in-band signaling.

Additional elements of network 10 are Intelligent Peripheral/Service Node (IPSN) 105 and Service Management System peripheral (SMS) 106. IP is a generic term for various processors that supply specific functions, such as voice mail, short message service, etc. IP's do not switch calls nor are they involved in the routing decisions needed to complete a call. The SMS 106 is a processor that provides the ability to create new services by providing an easy interface to the applications on SCP 102.

The WIN Architecture has an automatic, network-based method of tracking the location of mobile telephones. Mobility management does not require user intervention. Furthermore, the WIN has network-based applications that are available to individual subscribers. The subscriber profiles that are stored in the HLR indicate which applications each subscriber is authorized to use.

Figure 2:
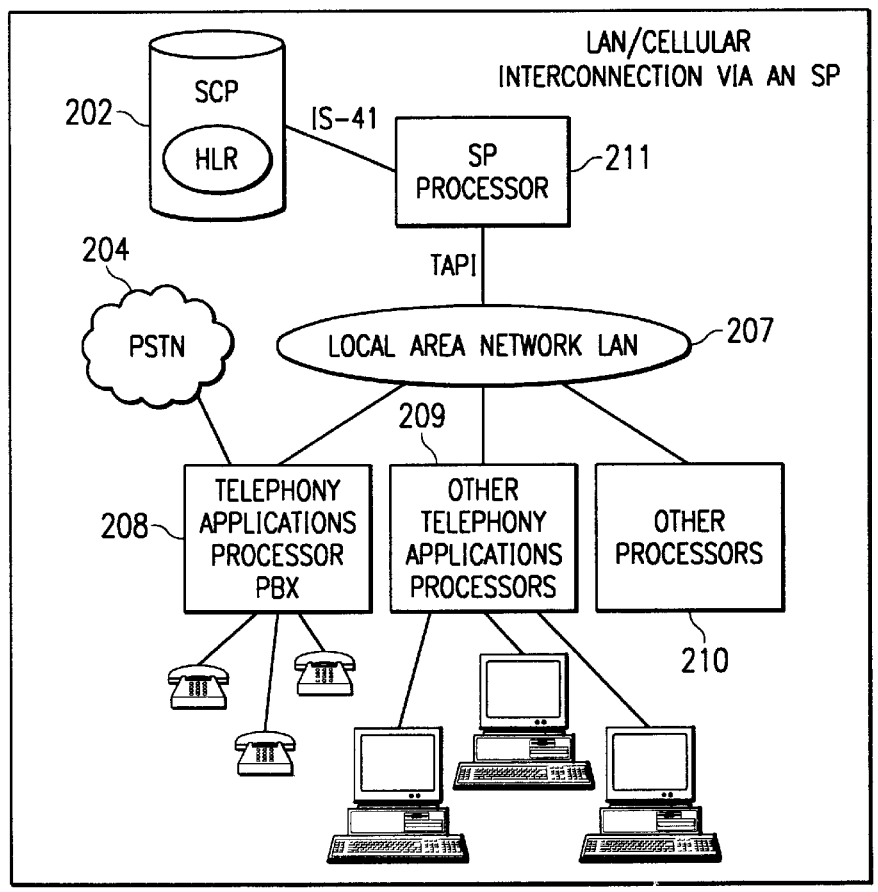
FIG. 2 illustrates a preferred embodiment of the invention showing a Local Area Network/Cellular interconnection via a sub-SCP process (SP)

FIG. 2 illustrates an exemplary embodiment of the transaction side of the subject invention. It is useful to review this practical example to understand the details of the subject invention presented in the later drawings.

Local Area Network (LAN) 207 is connected to PBX application processor 208, telephony application processors 209 and SP Processor 211, which executes the software embodiment of the subject invention. All processors communicate with LAN 207 over any one of a number of well known methods used in commercial LAN configurations, such as Token ring or Ethernet. Also, any one of a number of protocols can be used to communicate over these transports, such as TCP/IP or NETBEUI. The communication method and protocol is not material to this invention. The applications that need to access telephony information 208, 209 will implement one of a number of telephone application programming interfaces, for example, Microsoft Corporation's TAPI. The application opens TAPI defined channels to the SP and communicates with it in a manner defined by TAPI. SP Processor 211 translates TAPI into messages that are recognizable to the cellular network, for example IS-41 commands, which are then transmitted to and from the SCP 202 via an X.25, TCP/IP or other private or public data link. As TAPI does not define messages knowledgeable about mobility, the subject invention also provides logical mapping of the requests between the two networks. For example, TAPI does not provide for the equivalent of REGISTRATION on the network. The subject invention infers REGISTRATION when the TAPI message indicates that the telephone is in use. The subject invention then takes that fact and launches a REGISTRATION notification message to the HLR. A table illustrating a preferred mapping of IS-41 messages to functions is provided in Table 1. It will be understood that other messages and functions can also be included in the mapping.

TABLE I

| IS-41B Message Name (Total message set) | IS-41 defined Usage. (SP is logically located as a MSC) | SP required support |
|---|---|---|
| HandoffMeasurementRequest | From Serving MSC to adjacent MSC | SP will not launch this message. If received, SP is to return an error; OperationNot Supported. |
| FacilitiesDirective | From Serving MSC to Target MSC | SP will not launch the message. If received, SP is to return an error, OperationNot Supported |
| MobileOnChannel | From Target MSC to Anchor | SP will not launch the message. If received, SP is to return an |

TABLE I-continued

| IS-41B Message Name (Total message set) | IS-41 defined Usage. (SP is logically located as a MSC) | SP required support |
|---|---|---|
| | MSC | error; OperationNot Supported. |
| HandoffBack | From Serving MSC | SP will not launch the message. If received, SP is to return an error; OperationNot Supported. |
| FlashRequest | From Serving MSC | SP will not launch the message. If received, SP is to return an error; OperationNot Supported. |
| HandoffToThird | From Serving MSC | SP will not launch the message. If received, SP is to return an error; OperationNot Supported |
| QualificationRequest | From MSC-V to HLR | SP will launch this message to determine if the SUB has a valid and authorized MIN on the cellular network. If received, SP is to return an error; OperationNot Supported |
| QualificationDirective | From HLR to MSC | SP will receive this message and record the contained profile settings. SP will not launch this message. |
| RegistrationNotification | From MSC to HLR | SP will send this message to indicate that the PBX extension is active and the SUB is now located at the PBX. If received, SP is to return an error; OperationNot Supported |
| RegistrationCancellation | From HLR to MSC | SP will receive this message to indicate that the SUB is now active at another location. SP will not launch this message. |
| LocationRequest | From MSC to HLR | SP will send this message when it has the SUB as inactive on the PBX and a call pending. If received, SP is to return an error; OperationNot Supported. |
| RoutingRequest | From HLR to MSC | SP will receive this message and return the proper routing number to reach the SUB. The SP will launch this message if it has a call pending and the SUB is not active on the PBX. |
| RemoteFeatureControl Request | From MSC to HLR | SP will send this message to allow the SUB to change the mobile features from the office extension. If received, SP is to return an error; OperationNot Supported. |
| ServiceProfileRequest | From MSC to HLR | SP will send this message to confirm the SUB's mobile configuration. If received, SP is to return an error; OperationNot Supported. |
| ServiceProfileDirective | From HLR to MSC | SP will receive this message and update the current profile for the mobile. This message will not be sent by the SP. |
| TransferToNumberRequest | From MSC to HLR | SP will send this message to request transfer to number information. |
| CSSInactive | From MSC to HLR | SP will send this message to show that the SUB is no longer active on the PBX. If received, SP is to return an error; OperationNot Supported. |
| RedirectionRequest | From MSC to originating MSC | This message will not be implemented as it will require that the SP has an SS#7 address to allow messages from the originating MSC. There is currently no plans to allow the SP to have such an SS#7 address. |
| CallDataRequest | From MSC to HLR | This message will not be implemented. If received, SP is to return an error. |
| All set of O&M messages: Blocking; Unblocking; ResetCircuit; TrunkTest; TrunkTestDisconnect; UnreliableRoamerDataDirective | | This message is not supported by the SP. If received, SP is to return an error; OperationNot Supported |

SP Processor 211 translates messages from TAPI to IS-41 and back, and contains HLR-like information relating to applications within LAN 207.

Figure 3:
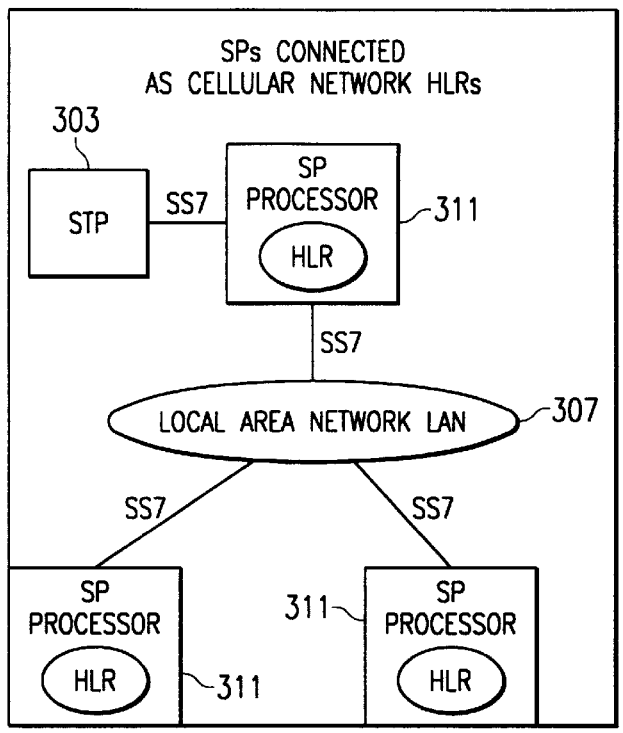
FIG. 3 illustrates SP processors connected to a Local Area Network (LAN) and connected to a cellular operator's service transfer point by an SS7 link.

FIG. 3 depicts use of SP processors 311 connected to LAN 307 and to STP 303 via SS7 links. In this embodiment of the invention, SP Processor 311 implements the SCP-based applications within the same processor or distributed processors on the LAN. The subject invention then translates the IS-41 messages into applications that execute locally instead of on SCP 202. In this embodiment, the local application replaces the SCP-based applications by providing a standard interface to the mobile network to allow less expensive implementation of SCP type applications.

Figure 4:
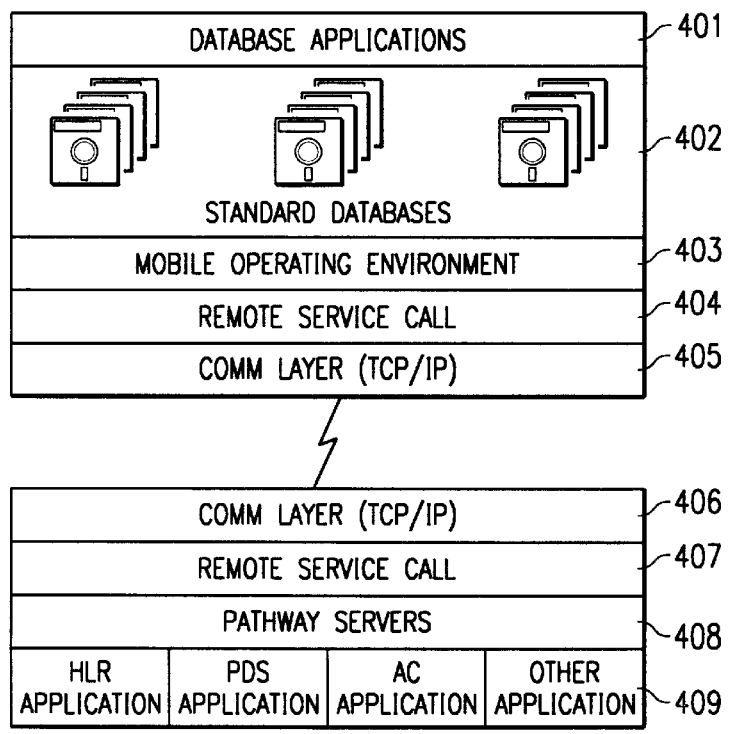
FIG. 4 illustrates the layering of the communications and applications that embody the connection described herein.

FIG. 4 illustrates the layering of the communications and applications that embody this type of connection. Database applications 401, which may be written in any number of languages, access standard databases 402 for information. Databases 402 are populated and updated from the network through the subject invention referred to here as the Mobile Operating Environment (MOE) 403. MOE 403 converts standard database requests into remote server calls 404 or other suitable and generally available transaction processors that coordinate with the SCP vendor specific database. In FIG. 4 the remote server call and pathway servers are commercially available products. The communications layer is also commercially available.

This embodiment converts standard database requests into the specific database transactions for SCP application database 409, thereby allowing applications to extract and process subscriber profile information.

Figure 5:
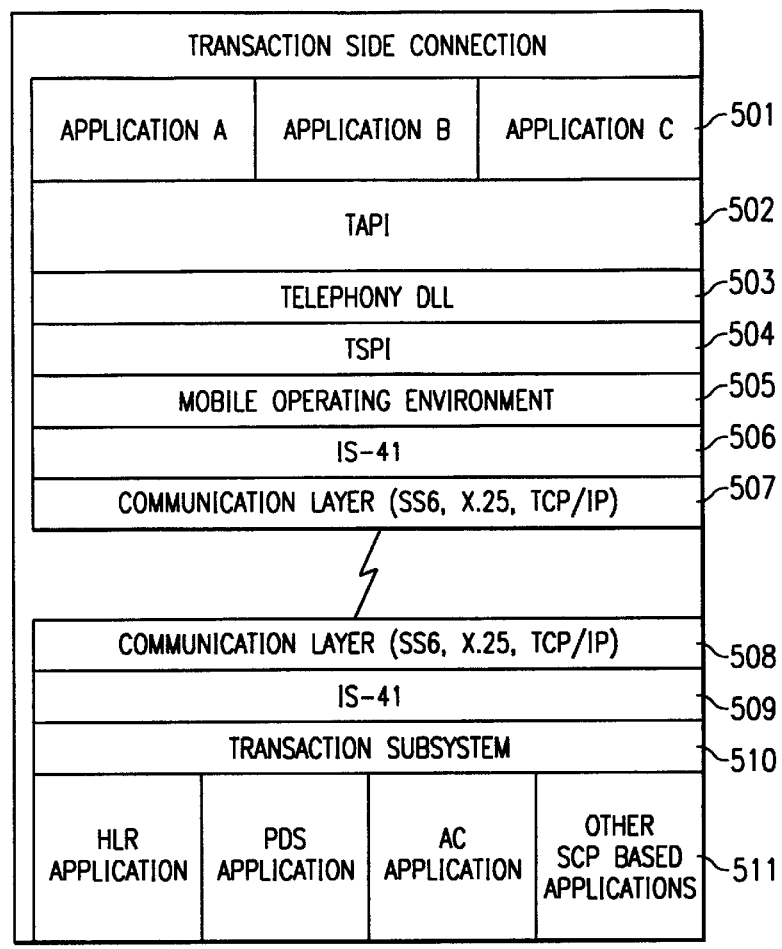
FIG. 5 illustrates the layers on the transaction side connection of the network interface.

FIG. 2 illustrates a PBX-cellular connection as an example of the transaction side connection of the subject invention. FIG. 5 shows the logical connection of the various software components to complete the connection. Applications 501 executing on the LAN use an Application Programming Interface (API), such as Microsoft's TAPI 502, which connects to Telephony Dynamic Link Library (DLL) 503 and then to the Telephone Service Provider Interface (TSPI) 504. MOE 505 maps the calls from the TAPI/TSAPI 502 into IS-41 messages 506. The messages are then carried over communications layer 507 to SCP 102. Items 508, 509, 510 and 511 are internal to SCP 102. The sub-systems internal to SCP 102 are not material and are shown here for example only.

The exemplary embodiment disclosed herein describes a connection between a cellular network, based on the WIN architecture, and a private network that hosts a PBX application. The functionality of the "sub SCP" (SP) is described and the implementation of cellular/PBX interconnection is described as a sample application, extended by the SP interconnection. Other applications can be applied using the same architecture, including, but not limited to:

- call redirection and auto follow me service (calls to the cell or PBX number are automatically directed to the station where the person is most likely to answer);
- fixed cell forwarding using PBX trunks (calls to the PBX number while the cellphone is fixed forwarded will result in the forwarding done at the PBX not the cell switch);
- integration with pagers and meet me bridges (calls to a PBX will invite the caller to leave a message or wait, then the system will page the subscriber to call in and join the call to the caller);
- PBX voice mail message waiting indication on cell phone (voice mails left on the office PBX will cause an indication on the cellular telephone);
- call screening based on CLID, time of day etc. (each PBX subscriber will be able to develop a screening list to route callers to local voice mail of cellular telephone depending on preselected criteria);
- screening list management from the cell phone;
- the number and type of PBX messages will be displayed on the cell phone; and
- PBX set feature control via the cell phone.

Additionally, with the TSAPI extensions provided by the SP other CTI applications can be easily and quickly developed.

The SP element of the subject invention consists of a process that translates TSAPI or other CTI protocols to IS-41 or future WIN protocols. This extension allows CTI applications software to be extended with mobility features. The system can also be set up to handle MAPI.

The SP process is connected to a cellular network-based SCP via an X.25 or similar private network connection. Signals and network messages from this connection are translated by the SP into TSAPI messages for use by application processes resident on the private network to which the SP is connected.

The SP is also connected via a second X.25 or similar private network to a network management center, where billing and provisioning are managed and where network operations will be monitored. Network management messages can use existing commercially available Simple Network Management Protocol (SNMP) to manage the SP processors remotely.

Furthermore, the SP process can be extended with an SS7 link in order to allow the SP process to serve as a general SCP/HLR in the cellular service provider's network. This will allow carriers to lower operating costs by having a software-based HLR process that can run on lower cost server-class PC's or similar processors. In this instance, the SCP process would be located on one of the cellular carrier's own private networks to ensure security and accessibility.

Call control is initially built on the IS-41 standard as it contains the required call processing commands and will require a minimum of re-programming at the SCP side. As new features develop a different or enhanced protocol may be required to provide the enhanced functionality that will result. The architecture of using the SP will continue for the foreseeable future as it will reduce the transaction capability and communication costs to the SCP while allowing extensive customization with the various PBX interfaces as well as other CPI applications that may exist at the customer's site.

Figure 6:
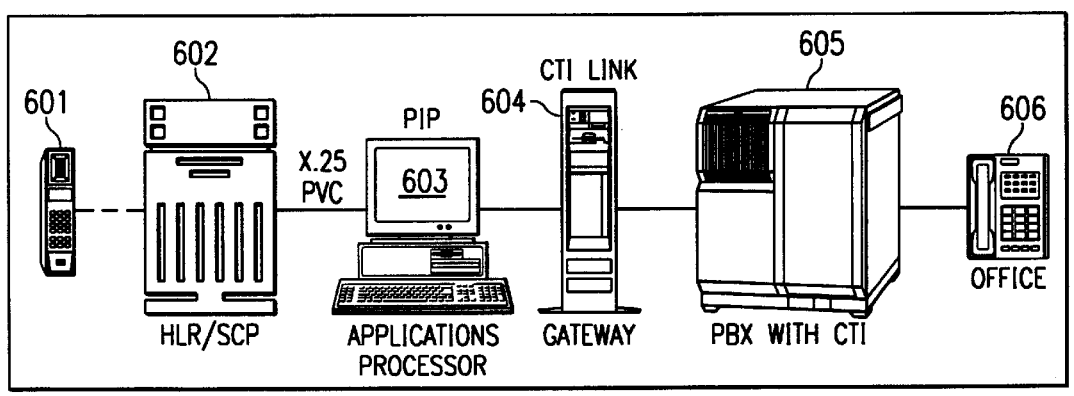
FIG. 6 is a block diagram of a preferred embodiment of the invention showing a wireline network connected to the wireless network.

A number of applications can be resident on the private network that can benefit from the SP interconnection to the cellular network. One such application is that of a PBX. The functioning of the PBX application, connected via the SP to the cellular network is further described as a preferred embodiment of the subject invention. FIG. 6 shows such an arrangement in detail with its PIP 603, HLR/SCP 602 and PBX with CTI 605. The CTI Link 604 and PIP 603 are designated as Cellpoint.

Cellular/PBX interconnection extends PBX private network applications with the inherent mobility management information that is contained in the cellular network. The SP converts the TSAPI link status that is used by the PBX into the IS-41 protocol that is supported by the HLR.

PBX users will have a number of configurable options that can customize the call treatment to suit the particular requirements. In general, however, features operate as follows:

- The Subscriber (SUB) will select which number, the cellular number or the PBX number, is to be the primary contact number.
- The last active location of the SUB will be tracked by the cellular based HLR 602. The HLR currently tracks active or registered mobile telephones through the use of a protocol to the actual handset. However, such a protocol does not exist for the
- PBX. The system will infer activation if PBX extension 606 is used to receive or place calls.
- PBX 605 detects set activity and passes this information to the PBX Interface Processor (SP) 603 through the CTI link 604.
- The SP converts the status information into IS-41 messages and launches the transactions to the HLR 602. The SP interprets the responses and launches routing directives to the PBX 605 through the CTI link 604.
- Calls routing to the cellular number first will complete to the mobile if active. If the subscriber is actually active on PBX 605, HLR 602 will launch a RoutingRequest to the SP and confirm the routing digits. These drgits will be treated exactly the same as a TLDN used to set-up a call in the cellular network.

Calls routing to PBX 605 will be connected to PBX extension 606 if it is active. If PBX extension 606 is not active, the SP launches a LocationRequest to HLR 602 to obtain the TLDN, if mobile telephone 601 is active, or an AccessDeniedReason, if the mobile telephone 601 is not active. Routing to the defined coverage path then completes the call.

The exemplary embodiment allows the individual user to specify either mobile telephone 601 or office telephone 606 as the primary device. However, any communication device or telephone may be designated as the primary device. Callers can dial either the office number or the mobile number and be routed as outlined in Table 2. The voice mail system may be chosen independently from the primary telephone designation.

TABLE 2

| Office telephone Status | Mobile Status | Which number prime? | Call completed to: | No answer routing |
|---|---|---|---|---|
| Idle and active | any | Office | Office | Office voice mail |
| Idle and inactive | idle and active | Office | Mobile | Office voice mail |
| Inactive | inactive | Office | Office voice mail | N/A |
| busy and active | any | Office | Office voice mail | N/A |
| any | idle and active | Mobile | Mobile | Mobile voice mail |
| any | busy | Mobile | Mobile voice mail | N/A |
| idle and active | inactive | Mobile | Office | Mobile voice mail |
| inactive | inactive | Mobile | Mobile voice mail | N/A |

It should be noted that the term "wireline(d)" is used to describe the basic network with or without telephones and includes a private network. A resident application includes telephones and PCS. The term "wireless" includes applications that are connected to a PCS and can be independent of a PCS.

Another exemplary embodiment of the present invention provides a system for automatic call redirection between wireless and wireline networks. Wireline telephone 606 associated with PBX 605 is set to 'active' when any activity is detected on wireline telephone by PBX 605. Such activity may include an outgoing call, an incoming call, entering a code such as a dialed number or simply lifting and replacing the handset on wireline telephone 606. Other activities or events can also be used to imply that the user is active on wireline telephone 606.

Wireline telephone 606 is set to 'inactive' status when the user is believed to have left the vicinity of the wireline telephone. For example, if the user fails to answer an incoming call to wireline telephone 606 the state is set to 'inactive.' When the user is detected as being active on the wireline telephone, the state of the wireline telephone may be changed from 'inactive' to 'active.' If there is no answer at the wireline telephone, and there is no answer at the wireless telephone, then the state of the wireline telephone is set to 'unknown.'

When the state of wireline telephone 606 is detected to be active, calls to wireless telephone 601 are automatically forwarded to wireline telephone 606. PBX 605 passes the activity information to the SP, which converts the status information into IS-41 messages and notifies SCP 602 of the active status of wireline telephone 606. SCP 602 then sets the incoming call destination to wireline telephone 606. Thus, when an MSC queries HLR 602 with a location request, HLR 602 returns the number of wireline telephone 606 as the forward-to number for wireless telephone 601. The MSC then connects the call to wireline telephone 606 through the PSTN. Thus, once the state of wireline telephone 606 has been set to active, calls to wireless telephone 601 are redirected to wireline telephone 606 automatically. The advantage of this type of system is that the user does not have to manually set the call-forward-immediate feature of wireless telephone 601 in order to receive calls on the office extension. Furthermore, even if the user forgets wireless telephone 601 at home or in the car, or forgets to set the call-forward-immediate feature, calls to wireless telephone 601 are automatically forwarded to wireline telephone 606. The state of wireline telephone 606 remains active as long as the user continues to answer incoming calls.

In an another embodiment, the SP activates the call-forward-immediate feature of wireless telephone 601 with the forward-to number as the directory number of wireline telephone 606. In this embodiment incoming calls to wireless telephone 601 are automatically re-directed to wireline extension 606 by HLR 602, which contains information about the subscriber.

If desired, call screening may be provided so that certain calls to wireless telephone 601, based on time of day, day of week, caller identification or other relevant criteria, are forwarded to wireline telephone 606. If the call does not meet preselected screening criteria, it may be forwarded to another destination, such as voice mail.

In the embodiments described above, if the user fails to answer a call on both wireless and wireline telephones 601 and 606, then the state of wireline telephone 606 may be set to 'unknown.' In one embodiment, this is accomplished by the SP notifying SCP 602 of the 'unknown' status. The call-forward-immediate feature of wireless telephone 601 may also be deactivated by SP 602. When the status of wireline telephone 606 has been set to 'unknown' all calls to wireless telephone 601 are terminated at wireless telephone 601 or at another preselected destination, such as voice mail. The 'unknown' state of wireline telephone 606 is maintained until the user is found to be 'active' on wireline telephone 606.

In the embodiments described above, if a call is made to wireline telephone 601 and the user fails to answer the call, then the SP first determines if wireless telephone 601 can receive the call, that is whether wireless telephone 601 is active and registered in the network. This is accomplished by the SP first issuing a location request to the home HLR for wireless telephone 601. If wireless telephone 601 is registered with the network serviced by HLR 602, HLR 602 will supply a Temporary Local Directory Number (TLDN) to the MSC, which then completes the call to wireless telephone 601. If wireless telephone 601 is not registered with the network, then HLR 602 returns a signal indicating that wireless telephone 601 is not active. Thus, the call intended for wireline telephone 606 will not be forwarded to wireless telephone 601, but is forwarded to a previously agreed upon number, such as the voice mail for wireline telephone 606 or another telephone associated with the user.

If desired, call screening can be provided with the above embodiments so that only o certain calls to wireline telephone 606, based on time of day, day of week, caller identification and other relevant criteria, are forwarded to wireless telephone 601. If the call does not meet the criteria for call screening, it is forwarded to an alternative preselected destination, such as voice mail.

Although the present invention and its advantages have been described in detail, it should be understood that various changes, substitutions and alterations can be made herein without departing from the spirit and scope of the invention as defined by the appended claims.

What is claimed is:

1. A method for providing call routing between a wirelined switched intelligent network and a wide area wireless intelligent network, comprising the steps of:
monitoring a wireline telephone associated with said wireline switched intelligent network for an occurrence of at least one call connection activity event selected from the group consisting of:
an outgoing call is initiated from said wireline telephone,
an incoming call to said wireline telephone is answered, and
a handset of said wireline telephone is lifted and replaced;
notifying a network device that the wireline telephone is active when said at least one call connection activity event occurs;
setting an incoming call destination number in said device to a directory number for said wireline telephone when said wireline telephone is active;
receiving a call intended for a wireless telephone of said wireless network;
sending a location request to a locating device to determine the location of said wireless telephone;
receiving a Temporary Local Directory Number (TLDN) from said locating device; and
routing said call to the wireline telephone based on said received TLDN.

2. The method of claim 1, wherein said network device is a Service Control Point (SCP).

3. The method of claim 1, wherein said locating device is a Home Location Register (HLR).

4. The method of claim 1 wherein said call connection activity event occurs when an activation code is received by said wireline telephone.

5. The method of claim 1, wherein the notifying step further comprises the step of:
detecting when an activation code is entered in said wireline telephone.

6. A method for providing call routing between a wirelined switched intelligent network and a wide area wireless intelligent network, comprising the steps of:
detecting when an outgoing call is made from a wireline telephone;
notifying a device that said wireline telephone associated with said wireline switched network is active;
setting an incoming call destination number in said device to a directory number for said wireline telephone;
receiving a call intended for a wireless telephone of said wireless network;
sending a location request to a locating device to determine the location of said wireless telephone;
receiving a Temporary Local Directory Number (TLDN) from said locating device; and
routing said call to the wireline telephone based on said received TLDN.

7. A method for providing call routing between a wirelined switched intelligent network and a wide area wireless intelligent network, comprising the steps of:
detecting when an incoming call to a wireline telephone is answered;
notifying a device that said wireline telephone associated with said wireline switched network is active;
setting an incoming call destination number in said device to a directory number for said wireline telephone;
receiving a call intended for a wireless telephone of said wireless network;
sending a location request to a locating device to determine the location of said wireless telephone;
receiving a Temporary Local Directory Number (TLDN) from said locating device; and
routing said call to the wireline telephone based on said received TLDN.

8. A method for providing call routing between a wirelined switched intelligent network and a wide area wireless intelligent network, comprising the steps of:
detecting when a handset of a wireline telephone is lifted and replaced;
notifying a device that said wireline telephone associated with said wireline switched network is active;
setting an incoming call destination number in said device to a directory number for said wireline telephone;
receiving a call intended for a wireless telephone of said wireless network;
sending a location request to a locating device to determine the location of said wireless telephone;
receiving a Temporary Local Directory Number (TLDN) from said locating device; and
routing said call to the wireline telephone based on said received TLDN.

9. A met hod for providing automatic call redirection between a wirelined switched intelligent network and a wide area wireless intelligent network in an integrated communications system, comprising the steps of:
detecting an activity status of a wireline telephone associated with said wirelined switched intelligent network;
activating a call-forward-immediate feature of a wireless telephone of said wireless network to a directory number for said wireline telephone when said activity status of said wireline telephone is active;
receiving a call on said integrated communications system; and
completing said received call based on said activity status of said wireline telephone.

10. The method of claim 9, further comprising the step of:
deactivating said call-forward-immediate feature of said wireless telephone when said activity status of said wireline telephone is inactive.

11. The method of claim 9, further comprising the step of:
completing said received call to said wireline telephone when said received call is intended for said wireless telephone and said call-forward-immediate feature of said wireless telephone is activated.

12. The method of claim 9, further comprising the step of:
completing said received call to said wireline telephone when said received call is intended for said wireline telephone and said activity status of said wireline telephone is active.

13. The method of claim 10, further comprising the step of:
completing said received call to said wireless telephone when said received call is intended for said wireless telephone and said call-forward-immediate feature of said wireless telephone is deactivated.

14. The method of claim 10, further comprising the step of:
issuing a location request to a locating device to determine if said wireless telephone is in a position to receive a call.

15. The method of claim 14, further comprising the step of:
   receiving a Temporary Local Directory Number (TLDN) from said locating device.

16. The method of claim 15, further comprising the step of:
   completing said call to said wireless telephone based on said received TLDN.

17. The method of claim 14, further comprising the step of:
   receiving a signal from said locating device indicating said wireless telephone is not in a position to receive a call.

18. The method of claim 17, further comprising the step of:
   completing said call to a preselected number.

19. The method of claim 9, further comprising the step of:
   setting said activity status of said wireline telephone to active when an outgoing call is made from said wireline telephone.

20. The method of claim 9, further comprising the step of:
   setting said activity status of said wireline telephone to active when an incoming call is answered by a user on said wireline telephone.

21. The method of claim 9, further comprising the step of:
   setting said activity status of said wireline telephone to active when a handset of said wireline telephone is lifted and replaced.

22. The method of claim 9, further comprising the step of:
   setting said activity status of said wireline telephone to inactive when a deactivation code is entered on said wireline telephone.

23. The method of claim 9, further comprising the step of:
   setting said activity status of said wireline telephone to inactive when an incoming call to said wireline telephone is not answered.

24. A method for monitoring the status of a wireline telephone in an integrated communications system in which a wirelined switched intelligent network is coupled to a wide area wireless intelligent network, comprising the steps of:
   detecting when a wireline telephone associated with said wireline switched network is inactive;
   notifying a device that said wireline telephone is inactive;
   receiving a call intended for said wireline telephone on said integrated system;
   issuing a location request to a Home Location Register (HLR) in said integrated system to determine if a wireless telephone associated with said wireless network is able to receive a call, when the wireline telephone is inactive;
   receiving a Temporary Local Directory Number (TLDN) from said HLR; and
   completing said call intended for said wireline telephone to said wireless telephone based on said received TLDN.

25. The method of claim 24, further comprising the steps of:
   receiving a call for a wireless telephone associated with said wireless network;
   sending a location request to a locating device to determine the location of said wireless telephone;
   receiving a Temporary Local Directory Number (TLDN) from said locating device; and
   completing said call based on said received TLDN.

26. The method of claim 25, wherein said locating device is a Home Location Register (HLR).

27. The method of claim 24 wherein the wireline telephone is determined to be inactive when an incoming call to the wireline telephone is not answered.

28. The method of claim 24, further comprising the step of:
   receiving a signal from said HLR indicating said wireless telephone is not able to receive a call.

29. The method of claim 28, further comprising the step of:
   completing said call to a preselected number when said wireless telephone cannot receive the call.

30. The method of claim 24, wherein said device is a Service Control Point (SCP).

31. The method of claim 24, wherein said wireline telephone is assumed to be active when an outgoing call is made from said wireline telephone.

32. The method of claim 24, wherein said wireline telephone is assumed to be active when an incoming call to said wireline telephone is answered.

33. The method of claim 24, wherein said wireline telephone is assumed to be active when a handset of said wireline telephone is lifted and replaced.

34. The method of claim 24, wherein the detecting step comprises the step of:
   detecting when a deactivation code is entered in said wireline telephone.

35. The method of claim 24, wherein said detecting step comprises the step of:
   detecting when an incoming call to said wireline telephone is not answered.

36. An integrated network communications system, said system comprising:
   a switched cellular network based on wireless intelligent network architecture having a protocol and at least one Service Control Point (SfCP) with a Home Location Register (HLR);
   a private wirelined network having at least one open architecture server hosting a PBX and having a protocol; and
   an interface between said networks which translates the cellular protocol and private network protocol to effectively form said private network as an extension of said cellular network whereby said server co-acts with said SCP and said HLR to support an application for automatic call redirection between said wireless network and said wirelined network.

37. The system of claim 36, further comprising:
   means for detecting an activity status of a wireline telephone associated with said wirelined network.

38. The system of claim 37, further comprising:
   means for activating a call-forward-immediate feature of a wireless telephone associated with said wireless network to a directory number for said wireline telephone when said activity status of said wireline telephone is active.

39. The system of claim 38, further comprising:
   means for deactivating said call-forward-immediate feature of said wireless telephone when said activity status of said wireline telephone is inactive.

40. The system of claim 39, further comprising:
   means for receiving a call on said integrated communications system.

41. The system of claim 40, further comprising:

means for redirecting said received call based on said activity status of said wireline telephone.

42. The system of claim 37, further comprising:

means for notifying said SCP of said activity status of said wireline telephone.

43. The system of claim 42, further comprising:

means for issuing a location request to said HLR to determine if a wireless telephone associated with said wireless network is in a position to receive a call.

44. The system of claim 43, further comprising:

means for completing said call to said wireless telephone based on a Temporary Local Directory Number (TLDN) received from said HLR.

45. The system of claim 43, further comprising:

means for completing said call to a preselected number based on a signal received from said HLR indicating said wireless telephone is not in a position to receive a call.

46. A computer program product having a computer readable medium with computer program logic recorded thereon for use in a system for providing automatic call redirection between a wirelined switched intelligent network and a wide area wireless intelligent network, said computer program product comprising:

means for detecting an activity status of a wireline telephone associated with said wirelined switched intelligent network;

means for updating a Service Control Point (SCP) in said integrated system with said activity status of said wireline telephone;

means for receiving a call on said integrated communications system;

means for querying said SCP to determine whether said wireline telephone is active; and means for automatically forwarding a call intended for said wireless network to said wireline telephone when said wireline telephone is active.

47. The computer program product of claim 46, further comprising:

means for automatically forwarding a call intended for said wireline telephone to said wireless network when said wireline telephone is not active.

48. The computer program product of claim 46, wherein said means for automatically forwarding a call intended for said wireless network to said wireline telephone further comprises: means for forwarding only those calls that meet a preselected criteria.

49. The computer program product of claim 47, wherein said means for automatically forwarding a call intended for said wireline telephone to said wireless network further comprises: means for forwarding only those calls that meet a preselected criteria.

50. The computer program product of claim 49, further comprising: means for forwarding said call to the wireless network only if said wireless network is in a position to receive a call.

* * * * *